Sept. 6, 1966 E. D. KOLB 3,271,114
CRYSTAL GROWTH CONTAINER
Filed June 15, 1964
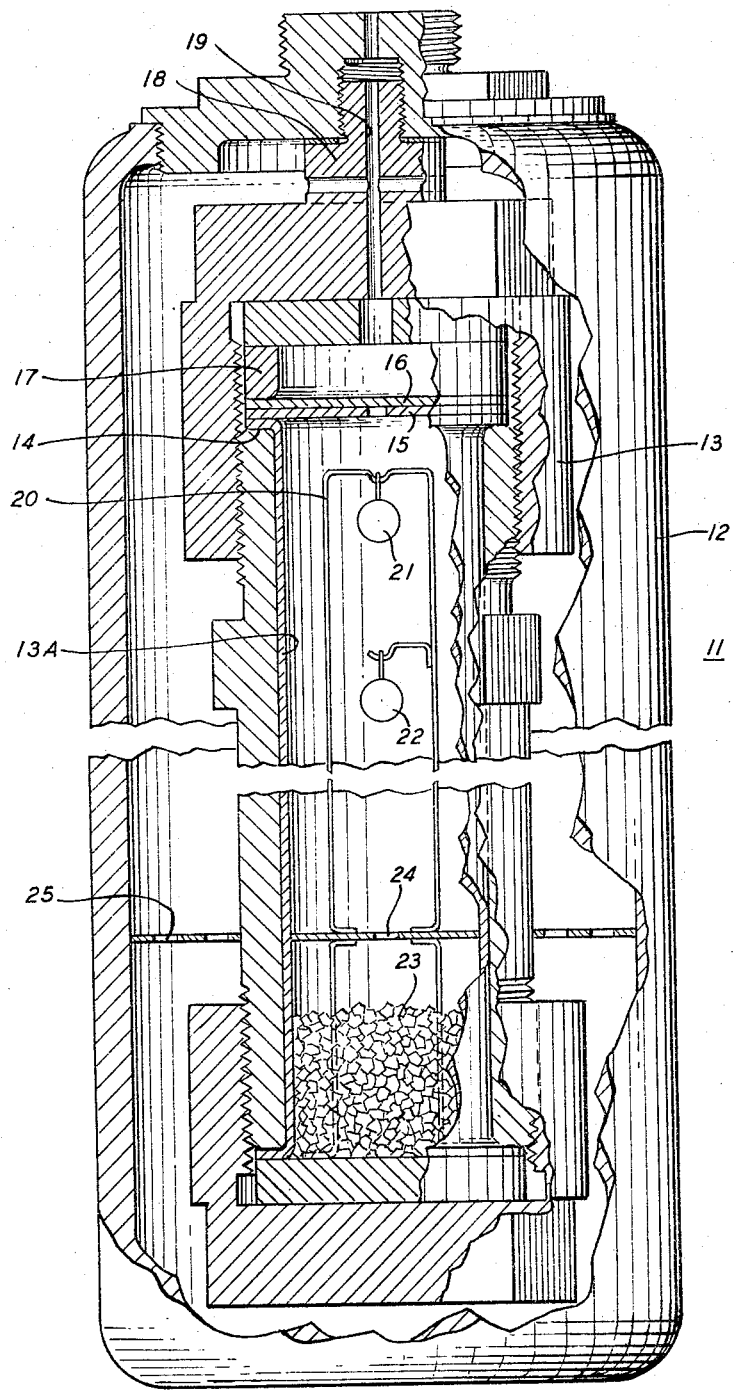
INVENTOR
E. D. KOLB
BY
Edward M. Fink
ATTORNEY 3,271,114
CRYSTAL GROWTH CONTAINER
Ernest D. Kolb, New Providence, N.J., assignor to Bell Telephone Laboratories, Incorporated, New York, N.Y., a corporation of New York
Filed June 15, 1964, Ser. No. 375,096
1 Claim. (Cl. 23—273)

This invention relates to a crystal growth container. More particularly, the present invention relates to a hydrothermal crystal growth container including a noble metal lined inner container.

In recent years, attempts have been made to grow a variety of crystalline materials by hydrothermal techniques utilizing an autoclave comprising a noble metal container within a cylindrical vessel, typically comprised of a steel alloy. Unfortunately, such reactors have not been completely satisfactory in that difficulties in maintaining a pressure balance between the container and outer vessel have often resulted in leaks, thereby contaminating the growing crystals.

In accordance with the present invention, the difficulties noted above are effectively avoided by the use of a hydrothermal autoclave including a noble metal lined container within a cylindrical vessel. The lined container includes a pair of rupture disks, the inner of which is perforate, the outer of which is a solid member and adapted to rupture in an outward direction at a predetermined pressure differential. The function of the inner disk is to preclude the inward rupture of the outer risk at a greater pressure differential than the said predetermined pressure differential. Apparatus of this type may typically withstand inner pressures as great as 10,000 p.s.i. and differential pressures between inner and outer chambers of the order of 4000 to 5000 p.s.i. inwardly and 1000 to 1500 p.s.i. outwardly. Apparatus of the described type is of particular interest for use in the growth of zinc oxide and yttrium iron garnet, systems which require unusually corrosive basic solutions of concentrated sodium hydroxide.

The invention will be more easily understood from the following detailed description taken in conjunction with the drawing wherein:

The figure is a cross-sectional view of a hydrothermal crystal growth reactor having disposed therein a noble metal lined container in accordance with the present invention.

Shown in the figure is a hydrothermal crystal growth reactor 11 including a cylindrical vessel 12 having disposed therein a cylindrical container 13 having a cylindrical noble metal liner 13A, being open at one extremity and closed at the other extremity, the former having a spun end 14. The upper extremity of liner 13A is provided with a pair of rupture disks, the inner of which, 15, is perforate and rests upon and is in intimate contact with spun end 14, the outer of which, 16, is solid and in juxtaposition with perforate member 15, and is so designed as to rupture at a predetermined pressure differential in an outward direction, the function of disk 15 being such as to support and permit disk 16 to rupture at some greater inward pressure differential. Immediately above and in juxtaposition with disk 16 is a rupture ring 17, the function of ring 17 being to provide adequate space for rupture of disk 16. Container 13 is provided with a suitable head 18 having vent 19 for the release of pressure.

In the operation of a hydrothermal crystal growth process utilizing the apparatus described, container 13 is provided with a seed frame 20 from which are suspended seeds 21 and 22, respectively, of the material which it is desired to grow from an aqueous solution of a nutrient 23 in which frame 20 is immersed. An internal perforate baffle 24 within container 13 serves to establish a relatively isothermal region above and below its location in the container. Similarly, an external baffle 25 is provided in the region between containers 13 and 12.

The perforate rupture disk selected for use in the apparatus described is designed to permit a maximum internal pressure differential within the range of 4000 to 5000 p.s.i. Materials found suitable for this purpose are platinum alloys of noble metals, for example, platinum-rhodium, et cetera. A particularly useful material for this use is a platinum-rhodium alloy containing from 10 to 20 percent by weight rhodium. The selection of a particular material is not critical, and it will be understood that the essential design requirement of the perforate member is that it be able to support the solid rupture disk at the pressures of operation.

The solid rupture disk is designed to withstand a maximum inward pressure differential within the range of 1000 to 1500 p.s.i. Several noble metal alloys are presently commercially available for this purpose, a particularly useful material being a platinum-palladium alloy containing 1 percent by weight palladium.

An example of the present invention is described in detail below. The example is included merely to aid in the understanding of the invention, and variations may be made by one skilled in the art without departing from the spirit and scope of the invention.

*Example*

This example describes the preparation of zinc oxide crystals by hydrothermal growth in the apparatus of the present invention.

The apparatus actually employed was similar to that shown in the figure and included a steel chamber 12 within which was a steel container 13, having an 0.75" O.D., a $1^{9}/_{32}$" I.D. and 9.5" in length. Disposed within container 13 was a platinum liner 13A having an 0.060" lip of an alloy of platinum and rhodium, the latter being present in an amount equal to 10 percent by weight. Rupture disk 15 was a perforate member, having a thickness of approximately 0.015", comprised of a platinum-10% rhodium alloy, rupture disk 16 being a conventional platinum-1% palladium rupture disk obtained from commercial sources and having a thickness of approximately 0.015". Seeds 21 and 22 were flux grown zinc oxide seeds, nutrient 23 comprising an aqueous solution of presintered reagent grade zinc oxide (20 grams of zinc oxide in 70 ml. of 6 N KOH). The apparatus was prepared in such manner that the inner liner would contain a 75 percent fill and the outer vessel (13) a 72 percent fill at the temperature of operation. Water in the prescribed amount was added to the outer vessel, the apparatus sealed and brought to a temperature ranging from 430° C. at the top to 447° C. at the bottom in 24 hours.

After 12 days of growth, no leakage was observed in the apparatus and a growth rate of zinc oxide of 23.3 mils per day was noted. The resultant crystals were amber in color and of the hemimorphic habit.

What is claimed is:

Hydrothermal crystal growth apparatus including an outer container and an inner container, said inner container being suspended within said outer container by means of a head therebetween, said inner container having disposed therein a noble metal liner including a pair of rupture disks, the inner of said disks being perforate, the outer of said rupture disks being solid and so designed as to rupture in an outward direction at a predetermined pressure differential, said head being so constructed that said rupture disks are the only impediment to a free exchange between said inner container, said outer container and the atmosphere, an external baffle in the annulus between said inner and said outer container, a baffle intermediate the inner chamber and a seed rack for suspending crystals above the baffle within said inner chamber.

References Cited by the Examiner

UNITED STATES PATENTS

| | | | |
|---|---|---|---|
| 1,584,523 | 5/1926 | Egbert | 220—89 X |
| 2,453,891 | 11/1948 | Burt | 220—89 X |
| 2,862,641 | 12/1958 | Phillip | 220—89 X |
| 2,895,812 | 7/1959 | Kohman | 23—301 X |
| 3,057,718 | 10/1962 | Lincoln | 220—89 X |
| 3,201,209 | 8/1965 | Caporaso et al. | 23—147 X |

NORMAN YUDKOFF, *Primary Examiner.*

G. HINES, *Assistant Examiner.*